(12) United States Patent
Doganata et al.

(10) Patent No.: US 8,988,427 B2
(45) Date of Patent: Mar. 24, 2015

(54) MANAGEMENT OF A HISTORY OF A MEETING

(75) Inventors: Yurdaer Nezihi Doganata, Chestnut Ridge, NY (US); Mercan Topkara, Thornwood, NY (US)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 13/616,015

(22) Filed: Sep. 14, 2012

(65) Prior Publication Data

US 2013/0007066 A1    Jan. 3, 2013

Related U.S. Application Data

(63) Continuation of application No. 12/826,919, filed on Jun. 30, 2010, now Pat. No. 8,786,597.

(51) Int. Cl.
*G06T 15/00* (2011.01)
*G06T 11/20* (2006.01)
(Continued)

(52) U.S. Cl.
CPC ............... *G06T 19/00* (2013.01); *G06Q 10/00* (2013.01); *G06T 17/20* (2013.01); *G06T 11/203* (2013.01); *G06T 11/206* (2013.01); *G06T 15/40* (2013.01); *G06T 15/405* (2013.01)
USPC ........... 345/419; 345/420; 345/421; 345/422; 345/423; 345/424; 345/426; 345/427; 345/440; 345/440.1; 345/440.2; 345/441; 345/442; 705/7.19; 705/7.23; 705/7.27; 707/797; 707/798

(58) Field of Classification Search
CPC ... G06Q 10/06; G06Q 10/101; G06Q 10/103; G06T 11/206; G09B 29/00
USPC .......... 345/440–442; 707/756, 802, E17.005, 707/E17.044, 758, 797, 798; 705/7.11, 705/7.12, 7.13, 7.16, 7.17, 7.18, 7.19, 7.21, 705/7.22, 7.23, 7.24, 7.27
See application file for complete search history.

(56) References Cited

U.S. PATENT DOCUMENTS 6,535,639 B1    3/2003   Uchihachi et al.
6,646,655 B1    11/2003  Brandt et al.
(Continued)

FOREIGN PATENT DOCUMENTS

CN    1581163 A    2/2005
EP    1453779 B1   9/2004

OTHER PUBLICATIONS

A. Hanjalic et al., "An Integrated Scheme for Automated Video Abstraction Based on Unsupervised Cluster-Validity Analysis," http://repository.tudelft.nl/assets/uuid:11893f52-4aed-47ad-a7e6-9fc46627699b/ieee_hanjalic_1999.pdf, 2009, pp. 1280-1289.

(Continued)

*Primary Examiner* — Jin-Cheng Wang
(74) *Attorney, Agent, or Firm* — William Stock; Ryan, Mason & Lewis, LLP

(57) ABSTRACT

Provenance techniques are disclosed for managing a history of a meeting. For example, a method for managing a history associated with a meeting comprises the following steps. Data associated with the meeting is collected. Provenance data is generated based on at least a portion of the collected data, wherein the provenance data is indicative of a lineage of one or more data items. A provenance graph is generated that defines a visual representation of the generated provenance data, wherein graph elements comprise one or more nodes and one or more edges between nodes, wherein nodes of the graph represent records associated with the collected data and edges of the graph represent relations between the records. One or more applications are associated with at least one graph element and are selectable to invoke functionality. The generated provenance graph is stored in a repository for use in analyzing the meeting.

16 Claims, 9 Drawing Sheets

(51) Int. Cl.
*G06T 19/00* (2011.01)
*G06T 17/20* (2006.01)
*G06T 15/40* (2011.01)
*G06Q 10/00* (2012.01)

(56) References Cited

U.S. PATENT DOCUMENTS

| | | |
|---|---|---|
| 6,690,725 B1 | 2/2004 | Abdeljaoud et al. |
| 6,956,573 B1 | 10/2005 | Bergen et al. |
| 7,143,352 B2 | 11/2006 | Divakaran et al. |
| 7,149,974 B2 | 12/2006 | Girgensohn et al. |
| 7,151,852 B2 | 12/2006 | Gong et al. |
| 7,203,620 B2 | 4/2007 | Li |
| 7,212,666 B2 | 5/2007 | Zhang et al. |
| 7,246,314 B2 | 7/2007 | Foote et al. |
| 7,356,763 B2 | 4/2008 | Lin et al. |
| 7,466,858 B2 | 12/2008 | Denoue et al. |
| 7,509,347 B2 | 3/2009 | Chambers |
| 7,530,021 B2 | 5/2009 | Cheng et al. |
| 7,593,618 B2 | 9/2009 | Xu et al. |
| 7,613,365 B2 | 11/2009 | Wang et al. |
| 7,664,821 B1 * | 2/2010 | Ancin et al. ............ 709/206 |
| 7,679,518 B1 | 3/2010 | Pabla et al. |
| 8,200,063 B2 | 6/2012 | Chen et al. |
| 2002/0069218 A1 | 6/2002 | Sull et al. |
| 2002/0097277 A1 | 7/2002 | Pitroda |
| 2003/0081937 A1 | 5/2003 | Li |
| 2003/0236792 A1 | 12/2003 | Mangerie et al. |
| 2004/0139042 A1 | 7/2004 | Schirmer et al. |
| 2004/0153456 A1 * | 8/2004 | Charnock et al. ............ 707/10 |
| 2005/0091579 A1 | 4/2005 | Mewherter et al. |
| 2005/0151735 A1 | 7/2005 | Boekhorst |
| 2006/0036563 A1 | 2/2006 | Wu |
| 2006/0047816 A1 | 3/2006 | Lawton et al. |
| 2006/0184872 A1 | 8/2006 | Dontcheva et al. |
| 2006/0271526 A1 * | 11/2006 | Charnock et al. ............ 707/3 |
| 2007/0046669 A1 | 3/2007 | Choi et al. |
| 2007/0112926 A1 | 5/2007 | Brett et al. |
| 2007/0168864 A1 | 7/2007 | Yamamoto et al. |
| 2008/0027921 A1 | 1/2008 | Chandrasekar et al. |
| 2008/0077869 A1 | 3/2008 | Cho et al. |
| 2008/0082557 A1 | 4/2008 | Ohara et al. |
| 2008/0109848 A1 | 5/2008 | Li et al. |
| 2008/0320509 A1 | 12/2008 | Gustafson et al. |
| 2009/0006608 A1 | 1/2009 | Gupta et al. |
| 2009/0049129 A1 | 2/2009 | Faisal et al. |
| 2009/0080853 A1 | 3/2009 | Chen et al. |
| 2009/0119246 A1 | 5/2009 | Kansal |
| 2009/0125365 A1 | 5/2009 | Masselle et al. |
| 2009/0177469 A1 | 7/2009 | Findlay |
| 2009/0177774 A1 | 7/2009 | Rehman et al. |
| 2009/0234721 A1 | 9/2009 | Bigelow et al. |
| 2009/0271438 A1 | 10/2009 | Agapi et al. |
| 2009/0287685 A1 * | 11/2009 | Charnock et al. ............ 707/5 |
| 2009/0313251 A1 | 12/2009 | Young et al. |
| 2010/0039296 A1 | 2/2010 | Marggraff et al. |
| 2010/0114627 A1 | 5/2010 | Adler et al. |
| 2010/0153160 A1 | 6/2010 | Bezemer et al. |
| 2010/0191741 A1 | 7/2010 | Stefik et al. |
| 2010/0299763 A1 | 11/2010 | Marcus et al. |
| 2010/0312726 A1 | 12/2010 | Thompson et al. |
| 2010/0321647 A1 | 12/2010 | Schuler et al. |
| 2011/0022967 A1 | 1/2011 | Vijayakumar et al. |
| 2011/0078635 A1 | 3/2011 | Fried |
| 2011/0137988 A1 | 6/2011 | Balogh et al. |
| 2011/0282706 A1 | 11/2011 | Ezra et al. |
| 2013/0006695 A1 | 1/2013 | Haustein et al. |

OTHER PUBLICATIONS

D.M. Russell, "A Design Pattern-based Video Summarization Technique: Moving from Low-level Signals to High-level Structure," 2000, IEEE, System Sciences, Proceedings of the 33rd Annual Hawaii International Conference.

Y.F. Ma et al., "A User Attention Model for Video Summarization," In Proceedings of ACM Multimedia, 2002, 10 pages, France.

B.L. Tseng et al., "Video Summarization and Personalization for Pervasive Mobile Devices," IBM, 2002, 12 pages.

B.L. Tseng et al., "Using MPEG-7 and MPEG-21 for Personalizing Video," IEEE, 2004, pp. 42-52.

A. Haubold et al., "Augmented Segmentation and Visualization for Presentation Videos," ACM, Nov. 2005, 10 pages, Singapore.

C-W. Ngo et al., "Video Summarization and Scene Detection by Graph Modeling," IEEE Trans. Circuits Syst. Video Technol, 2005.

C.M. Taskiran, "Automated Video Program Summarization Using Speech Transcripts," IEEE Transactions on Multimedia, Aug. 2006, pp. 775-791, vol. 8, No. 4.

B.T. Truong et al., "Video Abstraction: A Systematic Review and Classification," 2007.

Simone Stumpf et al., "The Use of Provenance in Information Retrieval, Workshop on Principles of Provenance (PROPR)", Nov. 2007, 2 pages, Edinburgh, Scotland.

J. Sasongko et al., "Efficient Generation of Pleasant Video Summaries," TRECVid Video Summarization Workshop, (TVS), Oct. 2008, Canada.

J. Basak et al., "Video Summarization with Supervised Learning," IBM, 2008.

B.W. Chen et al., "A Novel Video Summarization Based on Mining the Story-Structure and Semantic Relations Among Concept Entities," IEEE Transactions on Multimedia, Feb. 2009.

Liqiang Wang et al., "Atomicity and Provenance Support for Pipelined Scientific Workflows," Future Generation Computer Systems, May 2009, pp. 568-576, vol. 25, No. 5.

Heather Lonsdale, "Using Provenance to Aid Document Re-Finding," M.S. Thesis, Oregon State University, Jun. 2009, 67 pages, Covallis, OR, US.

M. K. Anand et al., "A Navigation Model for Exploring Scientific Workflow Provenance Graphs," Proceedings of the 4th Workshop on Workflows in Support of Large-Scale Science, Nov. 2009, pp. 1-10. ACM, New York.

M. K. Anand et al., "Exploring Scientific Workflow Provenance Using Hybrid Queries Over Nested Data and Lineage Graphs," Proceedings of the 21st International Conference on SSOM, 2009, pp. 237-254. Springer, Heidelberg.

M. Lux et al., "A Novel Tool for Quick Video Summarization using Keyframe Extraction Techniques," Proceedings of the 9th Workshop of the Multimedia Metadata Community, 2009, pp. 62-76, France.

Tara Gibson et al., "Application of Named Graphs Towards Custom Provenance Views," First Workshop on Theory and Practice of Provenance, USENIX Association, 2009, 5 pages, San Francisco, CA.

A. Jaimes et al., "Memory Cues for Meeting Video Retrieval," Proceedings of the 1st ACM Workshop on Continuous Archival and Retrieval of Personal Experiences (CARPE), Oct. 2004, pp. 74-85.

M-M. Bouamrane et al., "Meeting Browsing," Multimedia Systems, Mar. 2007, pp. 439-457, vol. 12, No. 4-5.

D. Hindus et al., "Ubiquitous Audio: Capturing Spontaneous Collaboration," Proceedings of the ACM Conference on Computer-Supported Cooperative Work (CSCW), Nov. 1992, pp. 210-217, Toronto, Ontario, Canada.

S. Luz et al., "Meeting Browser: A System for Visualising and Accessing Audio in Multicast Meetings," IEEE 3rd Workshop on Multimedia Signal Processing, Sep. 1999, pp. 587-592, Copenhagen, Denmark.

J.R. Rohlicek et al., "Continuous Hidden Markov Modeling for Speaker-Independent Word Spotting," International Conference on Acoustics, Speech, and Signal Processing (ICASSP), May 1989, pp. 627-630, vol. 1, Glasgow, U.K.

Jeffrey C. Reynar, "Topic Segmentation: Algorithms and Applications," Dissertation in Computer and Information Science, University of Pennsylvania, 1998, 187 pages.

F.C. Li et al., "Browsing Digital Video," Proceedings of the SIGCHI Conference on Human Factors in Computing Systems, Apr. 2000, pp. 169-176, The Hague, The Netherlands.

A. Waibel et al., "Meeting Browser: Tracking and Summarizing Meetings," Proceedings of the Broadcast News Transcription and Understanding Workshop, Feb. 1998, pp. 281-286.

(56) References Cited

OTHER PUBLICATIONS

S. Ram et al., "A New Perspective on Semantics of Data Provenance," Proceedings of the 1st International Workshop on the Role of Semantic Web in Provenance Management (SWPM), Oct. 2009, 6 pages.

A-W. Scheer et al., "ARIS Architecture and Reference Models for Business Process Management," Business Process Management, Models, Techniques, and Empirical Management, 2000, pp. 376-389, vol. 1806.

F. Curbera et al., "Business Provenance—A Technology to Increase Traceability of End-to-End Operations," Proceedings of the OTM Confederated International Conference, Part 1, LNCS, Nov. 2008, pp. 100-119, Monterrey, Mexico.

W. Geyer et al., "Towards a Smarter Meeting Record—Capture and Access of Meetings Revisited," Multimedia Tools and Applications, Dec. 2005, pp. 393-410, vol. 27, No. 3.

G.M. Olson et al., "Distance Matters," Human-Computer Interaction, Sep. 2000, pp. 139-178, vol. 15, No. 2.

P-Y. Hsueh et al., "Improving Meeting Summarization by Focusing on User Needs: A Task-Oriented Evaluation," Proceedings of the International Conference on Intelligent User Interfaces (IUI), Feb. 2009, pp. 17-26.

R. Gross et al., "Towards a Multimodal Meeting Record," Proceedings of IEEE International Conference on Multimedia and Expo (ICME), Jul. 2000, pp. 1593-1596.

M-M. Bouamrane et al., "Navigating Multimodal Meeting Recordings with the Meeting Miner," 7th International Conference on Flexible Query Answer System (FQAS), Lecture Notes in Computer Science, Jun. 2006, pp. 356-367, vol. 4027, Milan, Italy.

S. Luz et al., "A Model for Meeting Content Storage and Retrieval," Proceedings of the 11th International Multimedia Modelling Conference, Jan. 2005, pp. 392-398, Melbourne, Australia.

A. Waibel et al., "Advances in Automatic Meeting Record Creation and Access," Proceedings of the IEEE International Conference on Acoustics, Speech, and Signal Processing (ICASSP), May 2001, pp. 597-600, vol. 1.

W. Geyer et al., "Virtual Meeting Support in TeamSpace," Demo proposal accepted at the ACM Conference on Computer-Supported Cooperative Work (CSCW), Dec. 2000, 4 pages.

L. Wu et al., "Vaue of social network—A Large-scale analysis on network structure impact to financial revenue of information technology consultants," presented at the Winter Information Systems Conference, 2009, 25 pages, Salt Lake City.

C-Y. Lin et al., "SmallBlue: People Mining for Expertise Search,". IEEE MultiMedia, Jan. 2008, pp. 78-84, http://dx.doi.org/10.1109/MMUL.2008.17, vol. 15, No. 1.

U.S. Appl. No. 13/303,573, filed Nov. 23, 2011, entitled "Identifying Influence Paths and Expertise Network in an Enterprise Using Meeting Provenance Data."

Florian et al., "A Statistical Model for Multilingual Entity Detection and Tracking," HLT, 2004, 8 pages.

J.R. Bellegarda, "Latent Semantic Mapping, Signal Processing Magazine," IEEE 2005, pp. 70-80.

D. Blei., "Introduction to Probabilistic Topic Models," Communications of the ACM 2011, pp. 1-16.

Topkara et al., "Tag Me While You Can: Making Online Recorded Meetings Shareable and Searchable," IBM Research Report, rc25038, (w1008-057), Aug. 18, 2010, 11 pages.

Y.L. Simmhan et al., "A Framework for Collecting Provenance in Data-Centric Scientific Workflows," 2006, 8 pages, Indiana University, Bloomington, Indiana.

* cited by examiner

502 RECORD TYPE

| id | String |
|---|---|
| class | String |
| type | String |
| appId | String |
| displayName | String |
| storeXML | storeXMLType |

504 MEETING TYPE

| meetingId | String |
|---|---|
| meetingTitle | String |
| meetingLocation | String |
| meetingTime | dateTime |
| inviteeList | inviteeListType |

506 DATA RECORD TYPE

| creator | String |
|---|---|
| creationTime | dateTime |
| Location | contentReferenceType |

508 RELATION RECORD TYPE

| source | String |
|---|---|
| target | String |

510 RESOURCE RECORD TYPE

| name | String |
|---|---|
| userId | String |
| emailAddress | String |
| manager | String |

512 TASK RECORD TYPE

| actor | String |
|---|---|
| startTime | dateTime |
| endTime | dateTime |
| inputData | DataRecordType |
| outputData | DataRecordType |

600

700

800

900

MANAGEMENT OF A HISTORY OF A MEETING

CROSS-REFERENCE TO RELATED APPLICATION

This application is a Continuation of U.S. patent application Ser. No. 12/826,919, filed on Jun. 30, 2010, the disclosure of which is incorporated herein by reference.

FIELD OF THE INVENTION

The present invention relates to provenance data and, more particularly, to provenance techniques for managing a history of a meeting.

BACKGROUND OF THE INVENTION

Meetings are considered as one of the most important activity in a business environment. Many organizations hold regular meetings as part of their routine operations. Delivering information, keeping each other updated, discussing issues around team projects, assigning tasks, tracking progress and making decisions are some of the reasons why meetings are very important part of a professional and human activity. Recording meetings are as important as conducting them. Members of an organization access past meeting records to recall details of a particular meeting or to catch up with others if they missed a meeting. People often refer to meeting records. The reasons include checking the consistency of statements and descriptions, revisiting the portions of a meeting which were missed or not understood, re-examining past positions in the light of new information and obtaining supportive evidence.

Before the advancement of computer and communication technologies, a significant amount of time and effort was spent on producing written documents related to the meetings. Transforming meeting minutes into written documents manually suffers from lack of accuracy, completeness and objectivity. The process of transforming meeting minutes into written documents puts a burden on the preparer who may not remember all the details or transcribe them correctly. Advances in computer and communication technologies made networked multimedia meetings possible. Virtual meetings over the Internet by sharing desktop applications and whiteboards with the integration of text, audio and video capturing capabilities have become a popular means of conducting meetings among the geographically dispersed users. Vast amount of audio, visual and textual data are being recorded and stored for such virtual meetings.

SUMMARY OF THE INVENTION

Illustrative embodiments of the invention provide provenance techniques for managing a history of a meeting.

For example, in one embodiment, a method for managing a history associated with a meeting comprises the following steps. Data associated with the meeting is collected. Provenance data is generated based on at least a portion of the collected data, wherein the provenance data is indicative of a lineage of one or more data items. A provenance graph is generated that defines a visual representation of the generated provenance data, wherein graph elements comprise one or more nodes and one or more edges between nodes, wherein nodes of the graph represent records associated with the collected data and edges of the graph represent relations between the records. One or more applications are associated with at least one graph element and are selectable to invoke functionality. The generated provenance graph is stored in a repository for use in analyzing the meeting.

Advantageously, illustrative embodiments of the invention provide a generic data model and infrastructure to collect and correlate information about how data was produced, what resources were involved and which tasks were executed in accordance with a meeting. Meeting provenance gives the flexibility to selectively capture information required to address a query about a subject meeting. Further, illustrative embodiment of the invention provide for associating various applications to graph elements (one or more nodes and/or one or more edges) to invoke further functionalities such as, by way of example only, browsing a slide, playing a video, sending an e-mail to a participant, etc. Thus, the applications may include but are not limited to video playback software, slide browser software, email management software, etc., while the further functionality may include but is not limited to browsing, playing, sending media, etc.

These and other objects, features, and advantages of the present invention will become apparent from the following detailed description of illustrative embodiments thereof, which is to be read in connection with the accompanying drawings.

BRIEF DESCRIPTION OF THE DRAWINGS

FIG. 5 illustrates meeting provenance base data types, according to an embodiment of the invention.

DETAILED DESCRIPTION OF PREFERRED EMBODIMENTS

Figure 1:
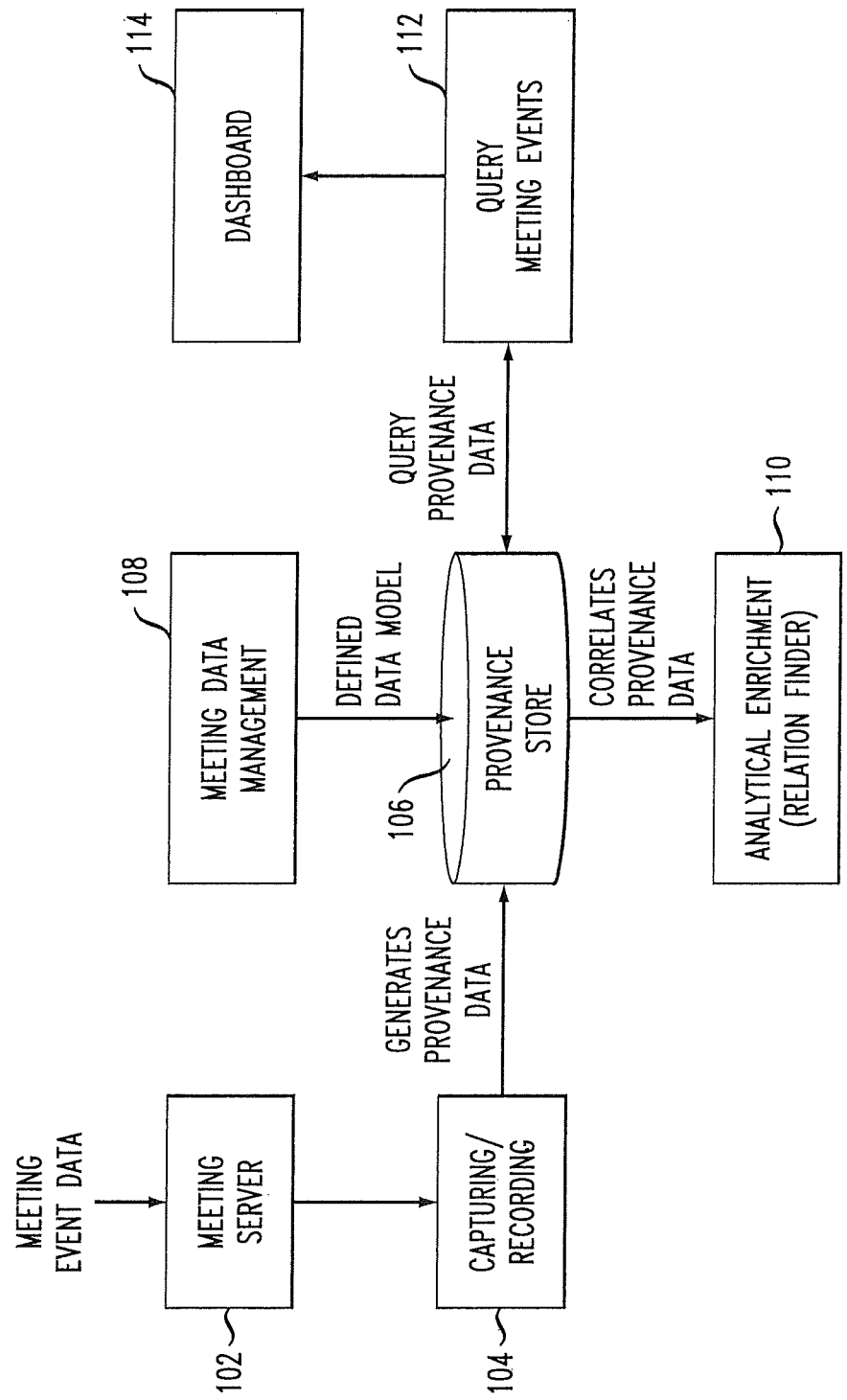
FIG. 1 illustrates a meeting provenance management system, according to an embodiment of the invention.

Illustrative embodiments of the invention may be described herein in the context of virtual meetings associated with a business. However, it is to be understood that the meeting history management techniques of the invention are not limited to virtual meeting applications associated with a business but are more broadly applicable to any meetings associated with any enterprise or enterprises.

As used herein, the term "enterprise" is understood to broadly refer to any entity that is created or formed to achieve some purpose, examples of which include, but are not limited to, an undertaking, an endeavor, a venture, a business, a concern, a corporation, an establishment, a firm, an organization, or the like. Further, a meeting associated with such an enterprise may involve one or more individuals.

As used herein, the term "provenance" is understood to broadly refer to an indication or determination of where something, such as a unit of data, came from or an indication or determination of what it was derived from. That is, the term "provenance" refers to the history or lineage of a particular item. Thus, "provenance information" or "provenance data" is information or data that provides this indication or results of such determination.

As used herein, the term "meeting" is understood to broadly refer to a coming together or gathering of persons and/or entities in a physical sense and/or a virtual sense (i.e., via computing devices connected via a network).

It is to be appreciated that the meeting history management techniques of the invention may be used in conjunction with the techniques for automatic discovery of enterprise process information described in pending U.S. patent application Ser. No. 12/265,975, filed Nov. 6, 2008, entitled "Processing of Provenance Data for Automatic Discovery of Enterprise Process Information," the disclosure of which is incorporated by reference herein in its entirety.

Illustrative principles of the invention focus on capturing and visualizing the provenance of a virtual meeting. Provenance in a general sense refers to the lineage of data and is used in tracking events that affect data during its lifetime. A primary purpose of creating a provenance is to gather artifacts to answer questions like what happened, where and when, how and by whom. Further analysis of provenance artifacts may also yield answers to why questions, i.e., root causes behind certain events. In the context of a meeting, provenance also helps to review and check meeting records effectively.

Meeting provenance data includes but is not limited to the participants, presentations, discussions, audio and video clips, meeting agenda and other related data captured during the meeting. It is realized, in accordance with illustrative principles of the invention, that a meeting can be modeled as a set of activities executed by various actors such as a process where textual and audio visual data are consumed or produced at different steps. In effect, a meeting is a process with a start and an end event and sequence of other events in between. Hence, provenance graphs may be generated for meetings applications. In a meeting provenance graph, meeting activities, data and participants are represented as nodes and causal relations are represented as edges. Since the graph contains information about the history of a meeting, related questions can be answered through a graph query interface.

Visualization of a meeting as a graph gives the users a better insight about the meeting flow, involvement of different participants and access to various meeting information simply by clicking on the corresponding icons in the graph. In the absence of visualization, without the meeting context, users do not have anchors for navigating artifacts of a meeting recording. Traditional multimodal search of meeting logs returns lists of results against keywords. Provenance graph queries, on the other hand, render the results in connection with other artifacts.

In the illustrative embodiments to be described below, we describe a meeting provenance management system. We then introduce an illustrative generic data model for a meeting application. The data model enables a standard way of accessing meeting history data. A meeting scenario is then used to illustrate different meeting data types. Then, we illustratively explain how meeting related information is extracted from the provenance graph.

FIG. 1 shows components of a meeting provenance management system according to one embodiment of the invention. As shown in provenance management system 100, meeting server 102 hosts the virtual meeting that is to be recorded. That is, in the case of a virtual meeting with geographically distributed participants, each participant logs onto the meeting server via the Internet using a network device (e.g., personal digital assistant (PDA), smart phone, laptop computer, desktop computer, etc.).

Meeting event data is captured by data capture/record module 104, via meeting server 102. The captured meeting events are converted into provenance data via module 104 and stored in provenance store 106. A data model is defined by meeting data management module 108. The data model is preferably in the form of a provenance graph. Core meeting provenance data types and their extensions are explained below.

Relations between data elements of the stored provenance data are extracted through analytical enrichment module 110. The enrichment module 110 enriches the provenance graph formed by meeting data management module 108 with the extracted relations. Thus, module 110 correlates the stored provenance data.

Once the captured meeting data is stored and the provenance graph is created, information about the meeting is retrieved by querying the provenance graph in the provenance store 106 via query interface module 112.

The information retrieved about the meeting as a result of querying the provenance graph can be rendered on a dashboard 114. The information rendered on the dashboard may include some effectiveness measures such as attendance rate, statistics about how long presentations or discussions last, how much participation achieved, etc.

Figure 2:
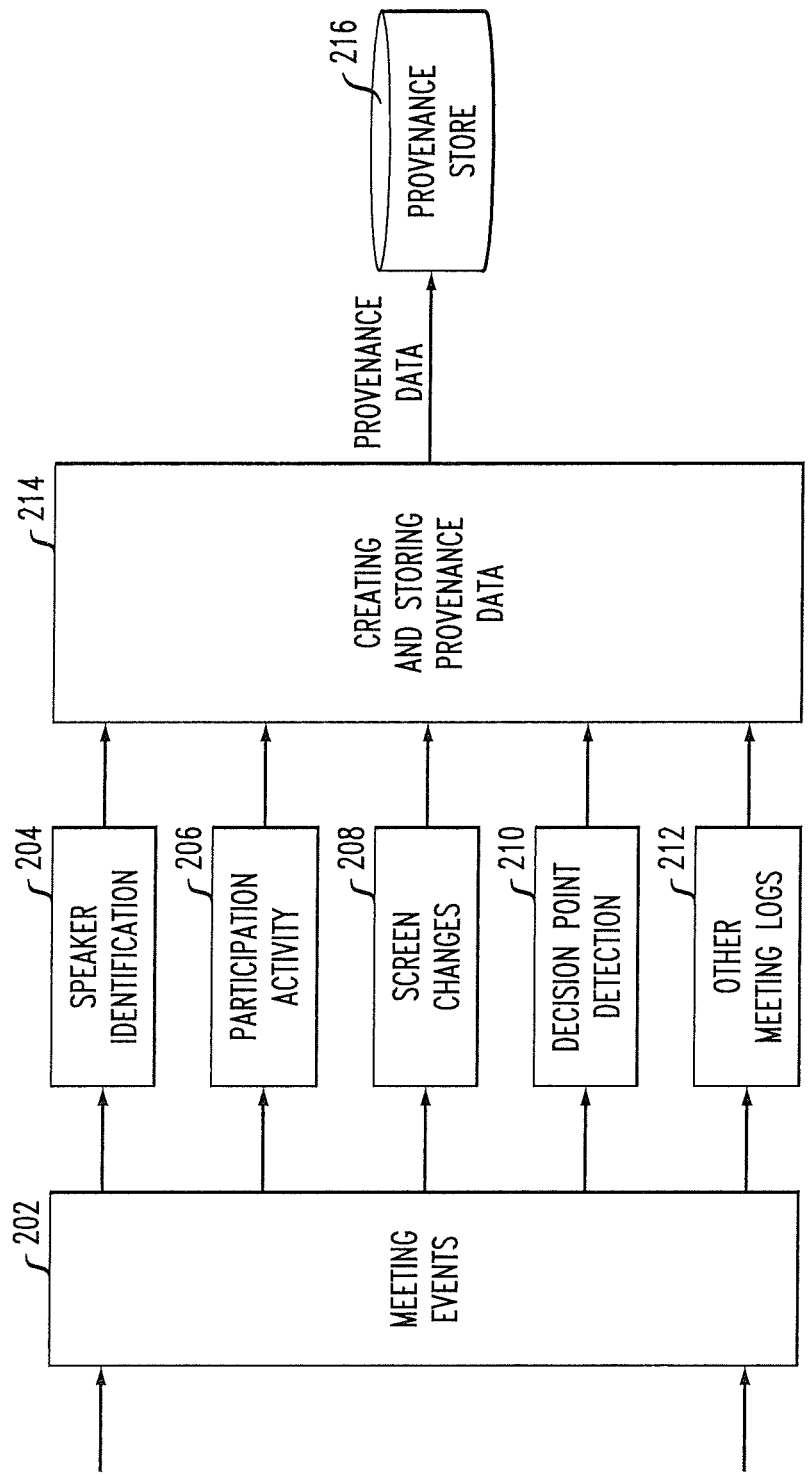
FIG. 2 illustrates a methodology for creating provenance data and a provenance graph associated with meeting events, according to an embodiment of the invention.

FIG. 2 illustrates a methodology 200 for producing provenance data from meeting event data, and generating a provenance graph. That is, FIG. 2 illustrates one embodiment of a methodology that may be employed by the capturing/recording module 104, as well as by meeting data management module 108 and analytical enrichment module 110, in FIG. 1.

It is to be appreciated that a plurality of existing technologies can be employed to capture meeting events 202. Examples of some existing technologies are shown in FIG. 2, e.g., speaker identification 204, participation activity 206, screen changes 208, decision point detection 210, and other meeting logs 212. However, it is to be understood that the technologies illustrated in FIG. 2 do not constitute an exhaustive list, and other technologies may be employed. Provenance data includes artifacts generated or utilized in a meeting as well as all meeting related activities. A detailed model for the provenance data is described below.

Provenance data is created 214 as a result of the analysis of the meeting events captured via technologies 204 through 212. The event data is mapped onto the meeting data model. The schema of the data model is provided by the meeting data management module 108. The results of these operations are stored in provenance store 216.

As an example, assume that speaker identification module 204 identifies the speaker as "Susan." Correlation of the duration and the time of screen captures (module 208) with the speaker indicate that Susan presented a slide deck. As a result, three graph nodes are created in the corresponding provenance graph. The first node is for Susan as a participant, the second node is for the slide deck as presentation data, and finally the presentation node is created as a meeting task. Nodes are connected with the edges by connecting participant and the slide deck with the presentation task. This correlation is provided by analytical enrichment module 110.

We now describe an illustrative generic meeting provenance data model created according to one embodiment of the invention. The captured artifacts of a meeting that are used to create the data model fall into following categories.

Data Records: These are the artifacts that were produced, utilized or modified during the execution of a meeting. Typically, these are the presentation slides, audio or video clips, voice transcripts, chat messages and database records.

Task records: A task record is the representation of a particular meeting activity. Usually, but not necessarily, meeting activities utilize or manipulate data and are executed by the meeting participants. Making a presentation, introducing participants, holding discussions, answering questions are various activities of a meeting.

Resource records: A resource record represents a person, or any resource that is the actor of a particular task. Participants, presenters, meeting organizers are the resources of a meeting.

Relation records: These are the records generally produced as a result of correlating two records.

Customer records: Custom records provide the extension point to capture artifacts like meeting goals, alerts, checkpoints, decision points, etc.

Meeting record: Meeting record is used to connect the artifacts that belong to a particular meeting together.

Figure 3:
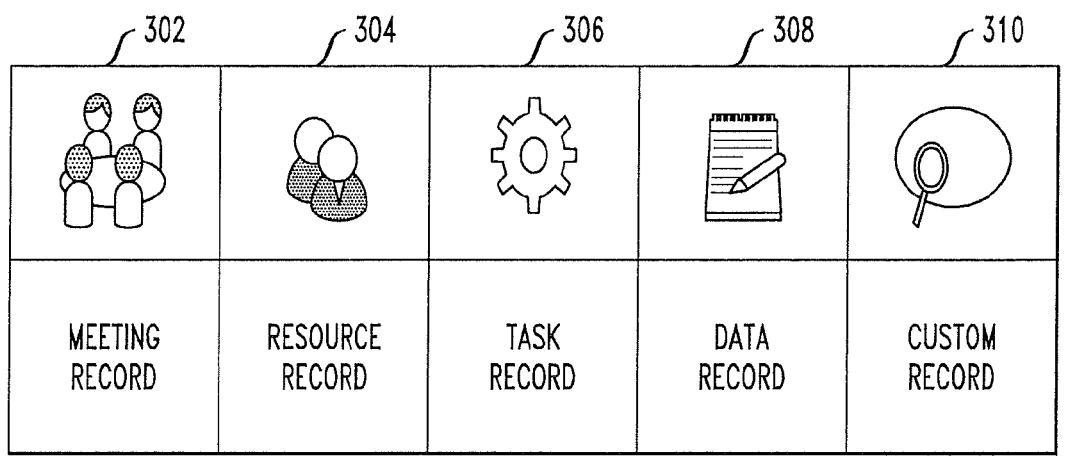
FIG. 3 illustrates iconic representations of data types used in a graph visualizer, according to an embodiment of the invention.

Those artifact types constitute the nodes of a provenance graph and the relation records represent the edges. FIG. 3 shows exemplary icons used to represent meeting provenance data types. The icons help to identify important meeting artifacts visually when the provenance graph is displayed to a user via a display device. For example, the icons shown include meeting record icon 302, resource record icon 304, task record icon 306, data record icon 308 and custom record icon 310.

Meeting provenance records reflecting data objects, tasks or resources are created by the recording probes. These are the event listeners of the underlying meeting systems, i.e., part of meeting server 102 in FIG. 1. In order to recreate a meeting end-to-end, provenance records must be connected together. This translates into creating edges in the provenance graph by adding relation records which can be done in multiple steps. Basic relations between a task and the manipulated data or a task and the resources can be established based on the information the task record holds.

As an example, presentation is one of the most common activities of a meeting. A particular presentation task starts when the presenter starts speaking and projecting the slides. As a result, the relations between the presentation task and the slides as well as the speaker are established automatically. More complex relations are discovered by running analytics (analytical enrichment) and locating the correct provenance records in the provenance graph. Other relations are established by utilizing the data outside of the provenance graph, such as the data stored in content repositories. As new relations are added, the underlying provenance graph gets continuously enriched, as the creation of some relations may trigger execution of other enrichment rules. As relations between provenance records are established, the hyperlinked structure provides, for each such record, a context that describes its lineage with a path into related events that had occurred prior to its existence, and related events that had happened later.

Figure 4:
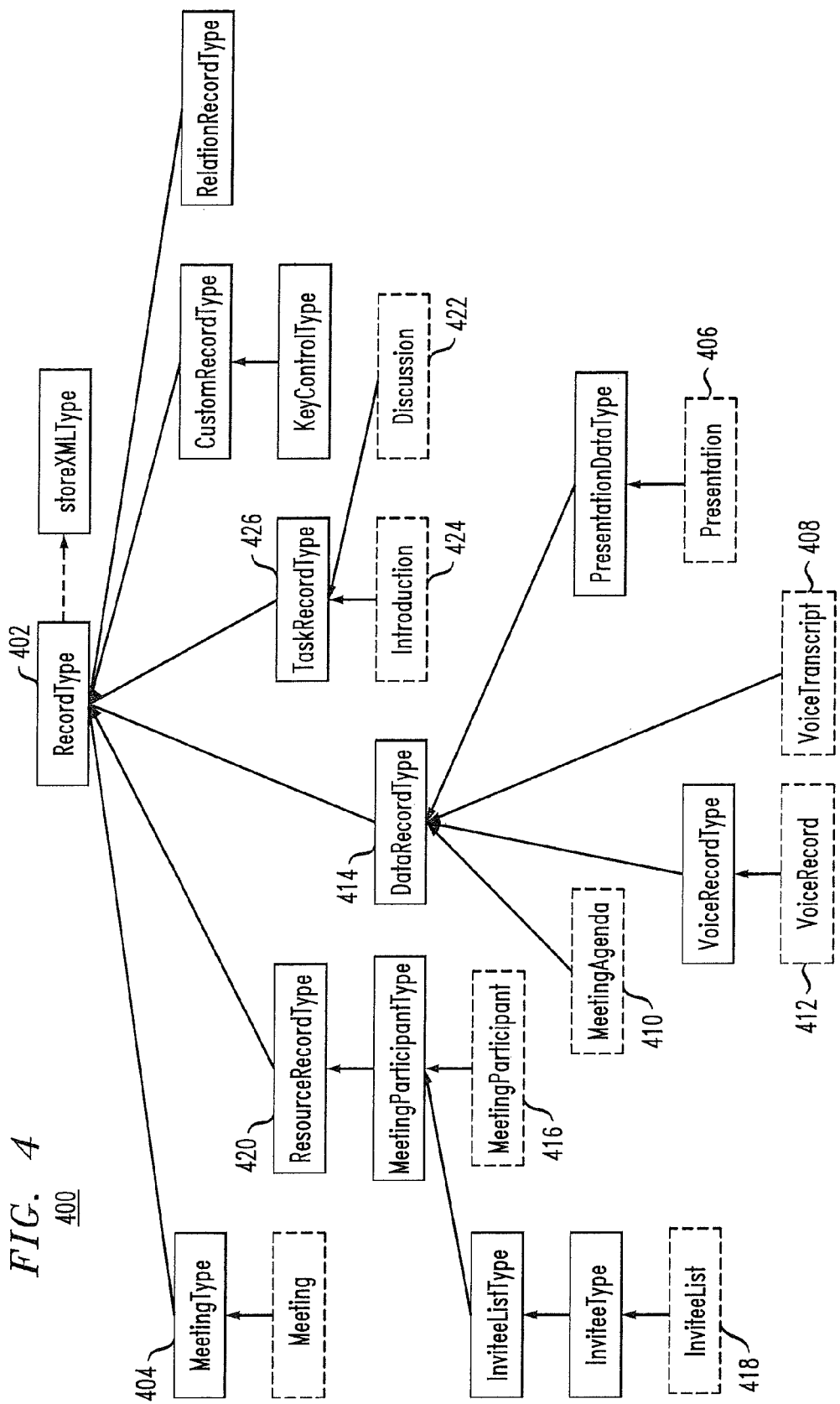
FIG. 4 illustrates a meeting provenance data model, according to an embodiment of the invention.

FIG. 4 shows an exemplary schema 400 for a meeting data model according to one embodiment of the invention. Each record is an extensible (e.g., Extensible Markup Language or XML) data structure and all records share common attributes such as: id, class, type, appId, and display name. Attributes class and type are used to identify and classify the records within the graph; the appId (application specific id) refers to the identifier of the application where the data is coming from and display name refers to naming how the business artifacts are displayed.

Hence, Record Type 402 is the base class for all other data types. Data and task artifacts are added to the provenance graph as the meeting progresses. Resource and custom records are often added after the fact by analytics. Those six record classes (resource, data, task, relations, meeting and custom) represent the nodes of the provenance graph. Attributes of a meeting such as meeting title, location, and time and invitee list are captured as a meeting record of type MeetingType 404.

A semantic relation between two meeting artifacts is expressed by an edge between the corresponding nodes materialized as a relation record. FIG. 4 shows several specializations of the basic record types. Presentation 406, Voice transcripts 408, MeetingAgenda 410, and Voice record 412 are some exemplary extensions of DataRecordType 414. On the other hand, MeetingParticipant 416, InviteeList 418 are extensions of ResourceRecordType 420 and Discussion 422 and Introduction 424 are the extensions of TaskRecordType 426. As shown, other extensions are also possible, and principles of the invention are not limited to any specific record types or extensions.

FIG. 5 shows the schema 500 for base meeting data types that we used in the example scenario including Record Type 502, Meeting Type 504, DataRecord Type 506, RelationRecord Type 508, ResourceRecord Type 510 and TaskRecord Type 512. We now illustrate a meeting provenance graph by using the scenario outlined below.

Assume the following meeting scenario. Bill prepares for a status meeting to discuss the progress of a project X. He sends out invites to John, Mary, Keith, Taylor, Suzan and Paul. Bill is the technical project lead, Mary is Bill's manager, Keith is the project manager, and Susan works as a software developer and Paul as an engineer in the project. Taylor is the customer relationship manager. Bill creates an agenda for the meeting. According to the agenda, Bill kicks off the meeting, presents the agenda and asks Susan and Paul make presentations about the software and hardware components of the project. All accept the invitations but Taylor.

This is a virtual meeting where participants join from geographically dispersed locations by using a web based meeting application (hosted by meeting server 102 in FIG. 1). Conversations are recorded, speakers are identified and transcripts are produced by employing a speech-to-text application.

On the day of the meeting, participants start joining in the conference bridge. The meeting is scheduled for 10:00 AM. Bill starts the virtual meeting as the chair person at 9:59 AM. Suzan and Paul joined to the meeting at 10:01 AM while John and Mary joined at 10:05 AM. Bill started the meeting at 10:05 AM and introduced the agenda and the project schedule. At 10:10 AM, Susan started presenting the progress of the software development by using a power point slide presentation. Susan brought up an interface problem between legacy systems and the new code. She suggested moving the planned delivery for the software component for one more week. Susan's presentation lasted 15 minutes and received questions from other participants for another 5 minutes. Bill, Mary and John asked questions. At the end of the question and answering session, the project scheduled is modified to reflect the change that Susan suggested. After Susan is done at 10:45 AM, Paul started his presentation by using his browser and making a demonstration. Paul's demo is completed at 10:55 AM and he received questions from Keith and Mary. Paul is done at 11:00 AM. Then, Bill started the final discussion session among the participants and the meeting lasted 10 minutes more than the scheduled time.

Key control points are used to check if the meeting is compliant with predefined meeting rules. They are included in the graph as an extension to CustomRecordType. A key control point represents a rule which is expressed in terms of nodes and edges in the graph. Hence, if a certain path exists in the graph between predefined nodes, then it may be an indication of the fulfillment of a control point. A key control point is added into the graph as an indication of compliance. A decision point can also be a key control point. It can be represented as a sub-graph of relations among various nodes.

The following meeting artifacts are extracted by using the meeting event and data recorders and data schema outlined in FIG. 4.

Data records: Meeting, Susan's presentation, Paul's Presentation, Meeting Agenda, Participants list, Invitee List, Voice Record A, Voice Record B, Voice Record C, Voice Record D, Voice Record E, Voice transcripts A, Voice transcripts B, Voice transcripts C, Voice transcripts D, Voice transcripts E, Project Schedule Task records: Introduction, Presentation 1, Presentation 2, Discussion, Question Answer Resource records: Bill, John, Keith, Susan, Mary, Paul Custom record: KCP1 (presentations should be no longer than 20 min), KCP2 (meeting should not last more than an hour)

Figure 6:
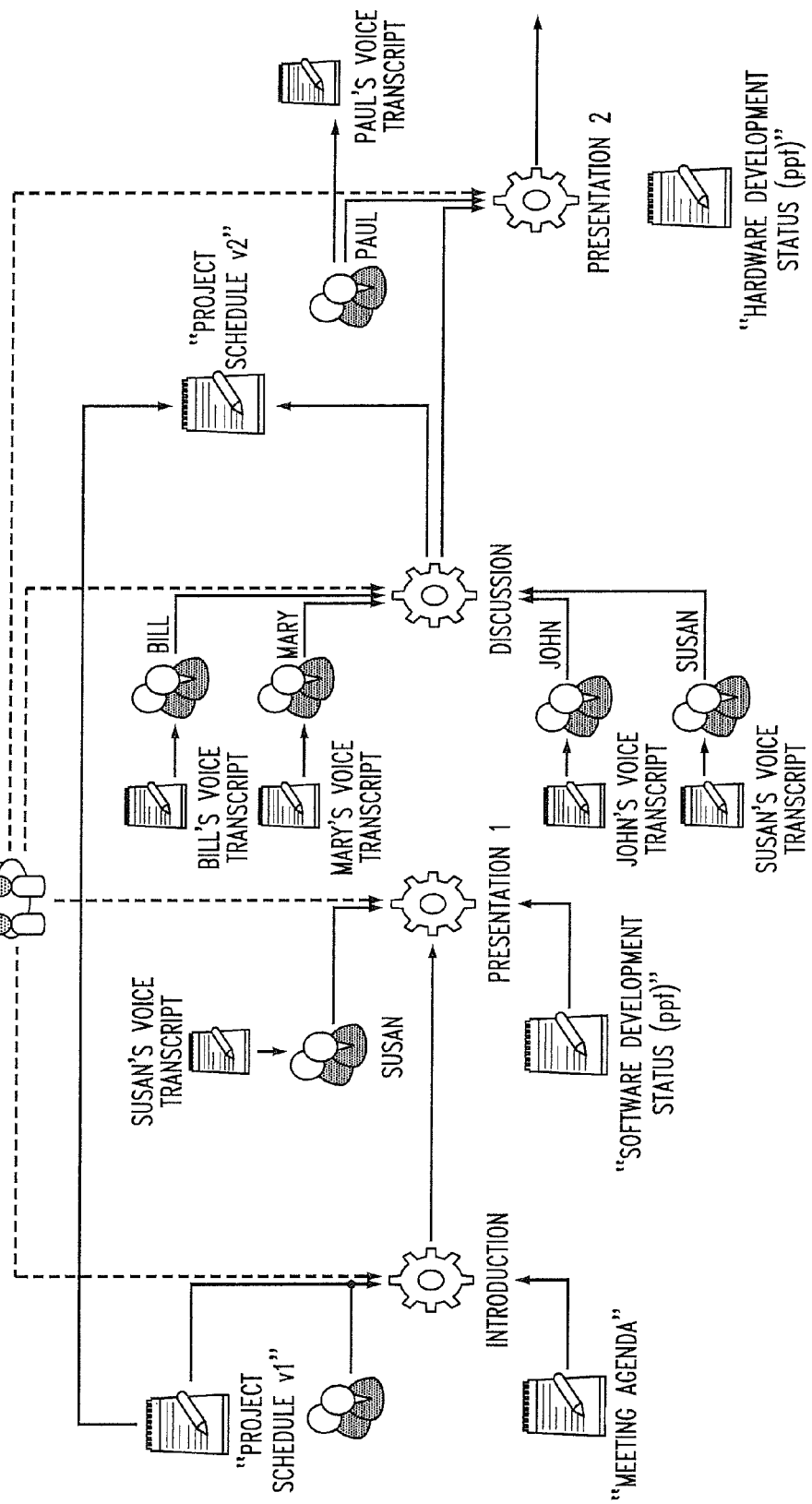
FIG. 6 illustrates a meeting provenance graph, according to an embodiment of the invention.

FIG. 6 illustrates a provenance graph 600 of the above meeting scenario. In the meeting scenario, we introduced above; Bill, Susan, Paul, Keith, Mary are ResourceRecordType, Bill's introduction, Susan and Paul's presentations, discussion are TaskRecordTypes, and Invitee List, agenda, project schedule, presentations are DataRecordTypes.

Assuming the meeting provenance graph 600, we now describe the process of extracting information from such a meeting provenance graph. As explained, information about the meeting is stored in the graph 600. Extracting information about the meeting from the provenance graph is equivalent to extracting the properties of the graph or discovering various sub-graph patterns. There is a number of existing graph query languages with various computational complexity and flexibilities. They can be classified as knowledge base query languages such as SPARQL, RQL, RAL, RDF Query language; graph reasoning query languages QWL-QL, GraphLog; Query languages with graph operators GOQL, GRAM and graphical user interface query language QGRAPH. There are also attempts to unify disparate graph query approaches such as GQL.

Provenance graph can be interacted in different ways. These include browsing the graph one step at a time, finding sub-graphs based on meeting related constraints, checking hypothesis expressions.

Figure 7:
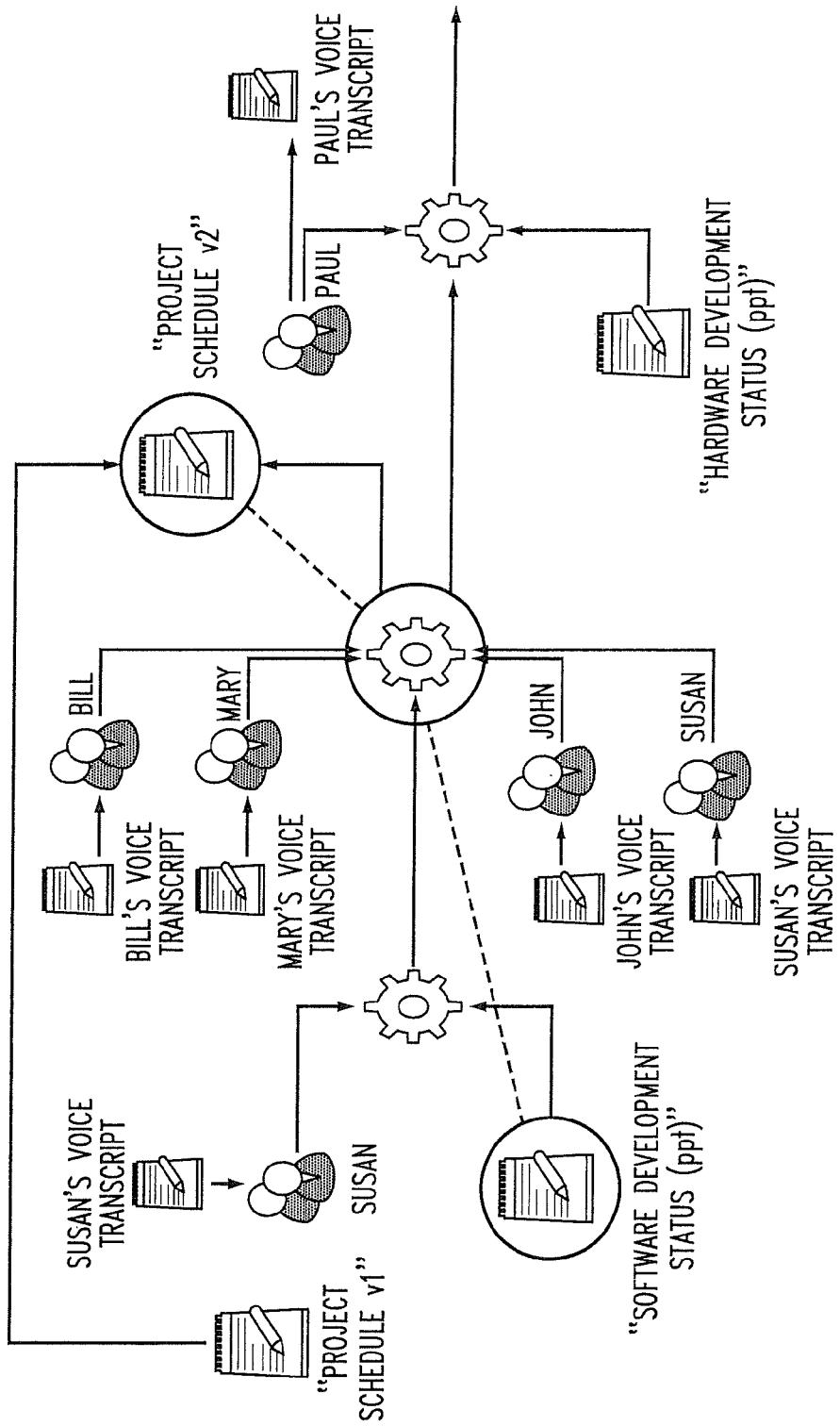
FIG. 7 illustrates a methodology for browsing a meeting provenance graph, according to an embodiment of the invention.

As an example, one may want to find out why the project schedule is modified by browsing through the graph. This process 700 is illustrated in FIG. 7. Navigating over the graph visualizer (i.e., presentation of the graph on a display associated with the management system 100) shows that the project is rescheduled after a discussion over Susan's software development presentation. One can further browse the content of the presentation to find out the reason or even search the voice transcripts for the root cause analysis.

One could also find answers to questions like what is the e-mail address of the person who presented "Hardware deployment status" by sending a graph query (via query interface module 112 in FIG. 1) that would extract all the "presentation" task nodes that are linked to "slide" data nodes with slide name "Hardware deployment status." Then, the resource node that is linked to the same presentation task is determined. The information about the presenter can be extracted from the attributes of the corresponding "presenter" node. Once the information is extracted, other applications such as chat or e-mail can be invoked to send messages to the presented from the same user interface.

Figure 8:
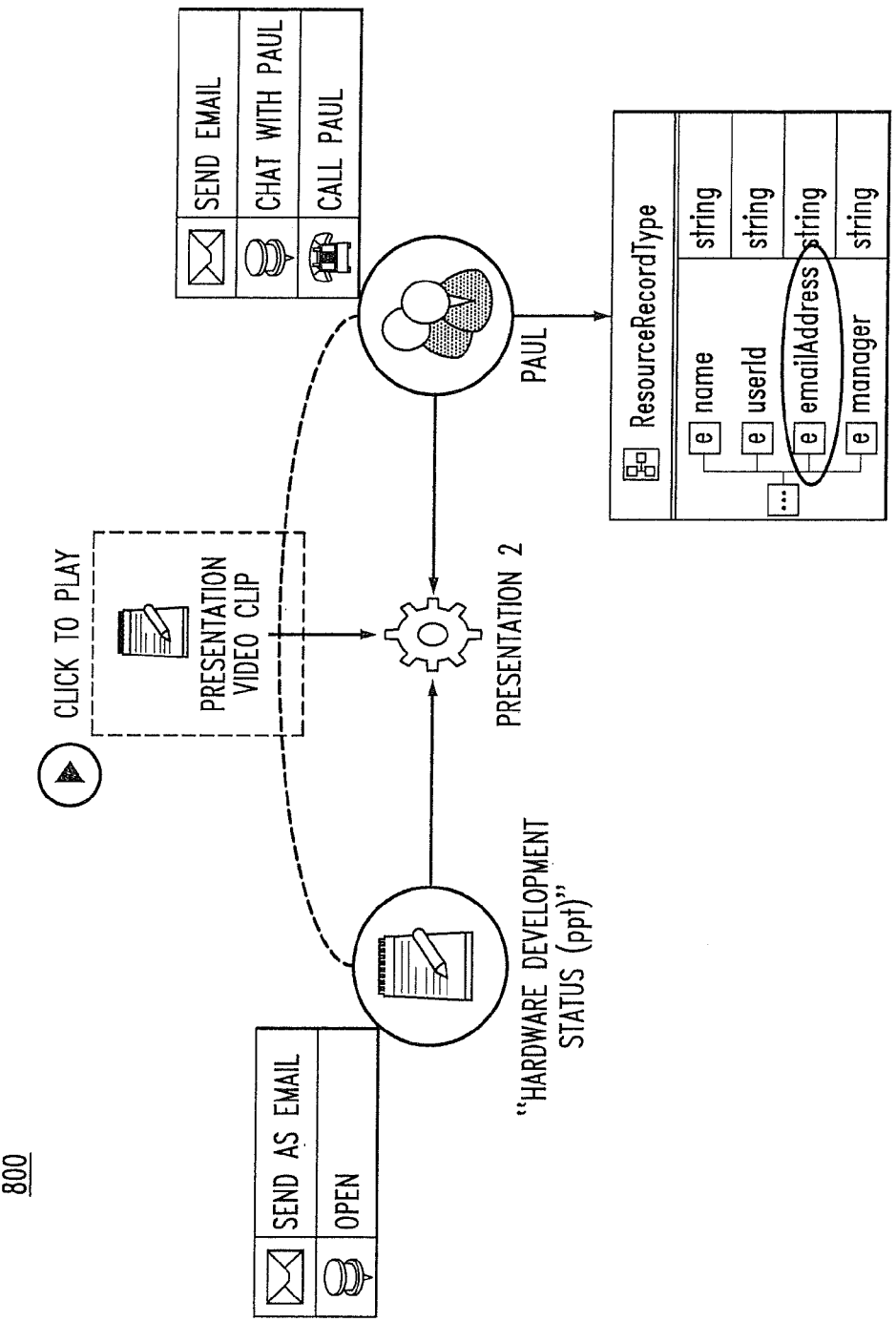
FIG. 8 illustrates a methodology for associating various applications to graph entities to invoke further functionalities, according to an embodiment of the invention.

FIG. 8 illustrates various applications that can be invoked from a user interface 800. As for the presenter, Paul, one can immediately contact Paul via phone, chat or email. The audio or the video clip of the presentation is available to play with a click as shown in the figure. Similarly, one can also open the presentation slides or send them as an e-mail. Thus, FIG. 8 describes an illustration of how various applications are associated to graph elements (one or more nodes and/or one or more edges) to invoke further functionalities such as, by way of example only, browsing a slide, playing a video, sending an e-mail to a participant, etc. One skilled in the art will realize other applications that can be associated with graph elements or entities such that they may be selected in the graph to invoke further functionalities for the user.

Advantageously, as has been illustratively explained in detail herein, visualizing the provenance of a meeting enables navigation through the business artifacts within the context of a meeting by exploring relations among different artifacts. A provenance graph is a structured form that captures the history information by selectively probing the relevant meeting event data. The number of nodes and edges in the graph depends on the amount of meeting information captured by the meeting recorder devices. As speech and video processing technologies advances, the size of the provenance graph is expected to grow with an increasing number of nodes and edges between nodes. The graph complexity, however, is managed by the users. The type and the amount of event data to be converted into graph data can be configured.

Another aspect of representing meeting provenance as a graph is the availability of mature graph query languages to retrieve information. The graph data model according to illustrative embodiments of the invention includes semantic relations between the meeting artifacts, thus enabling semantic search. This way one can search not only for the list of participants, but their roles and contributions and how they were involved in decision making. Similarly, the search results do not return only a list of presentation slides but who presented and when, if it impacted the decision point, etc.

Another aspect of analyzing the graph data is the creation of effectiveness measure for the meetings in terms of the attainment of original meeting goals. Possible meeting goals may include high attendance rate (e.g., 80%), covering the agenda items, being on schedule, etc. Meeting statistics such as these can be automatically rendered on a dashboard.

Furthermore, as has been illustratively explained in detail herein, principles of the invention provide for capturing, correlating and visualizing the execution of a meeting from the history data. Relevant artifacts that are utilized or generated during a meeting as well as meeting activities and resources are mapped onto a generic meeting data model. The execution of a meeting is then captured as a graph where generated meeting artifacts, participants and meeting tasks are connected. The graph enables faster and structured access to meeting data and provides for a visualization capability for users who want to browse quickly the sections of the meeting that are of most interest.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1-8, the diagrams in the figures illustrate the architecture, functionality, and operation of possible implementations of systems, methods and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Accordingly, techniques of the invention, for example, as depicted in FIGS. 1-8, can also include, as described herein, providing a system, wherein the system includes distinct modules (e.g., modules comprising software, hardware or software and hardware). By way of example only, the modules may include, but are not limited to, a meeting server module, a capturing/recording module, a meeting data management module, an analytical enrichment module, a provenance store module and a query interface module. These and other modules may be configured, for example, to perform the steps described and illustrated in the context of FIGS. 1-8.

Figure 9:
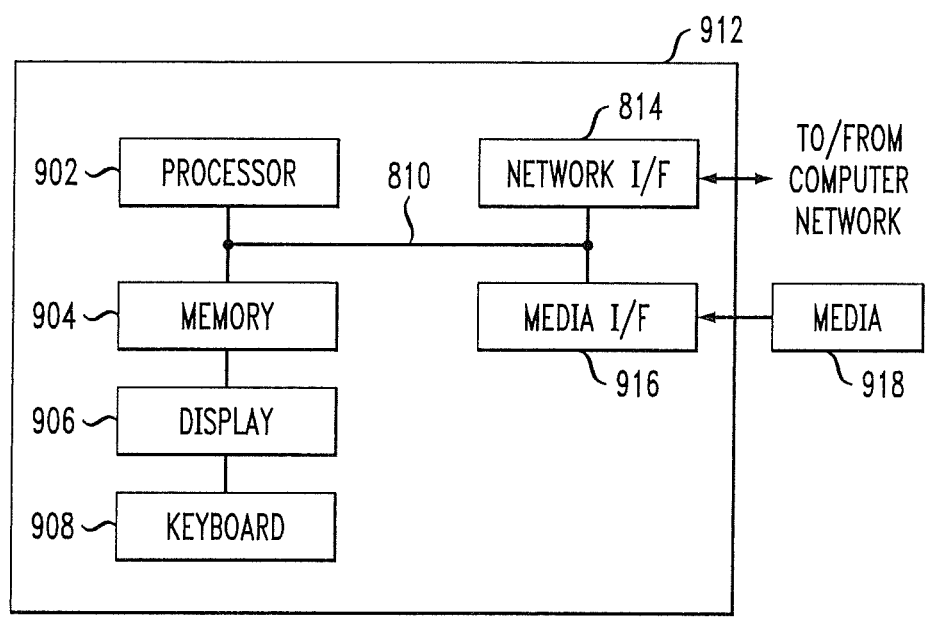
FIG. 9 illustrates a computing system in accordance with which one or more components/steps of the techniques of the invention may be implemented, according to an embodiment of the invention.

One or more embodiments can make use of software running on a general purpose computer or workstation. With reference to FIG. 9, such an implementation 900 employs, for example, a processor 902, a memory 904, and an input/output interface formed, for example, by a display 906 and a keyboard 908. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, keyboard or mouse), and one or more mechanisms for providing results associated with the processing unit (for example, display or printer).

The processor 902, memory 904, and input/output interface such as display 906 and keyboard 908 can be interconnected, for example, via bus 910 as part of a data processing unit 912. Suitable interconnections, for example, via bus 910, can also be provided to a network interface 914, such as a network card, which can be provided to interface with a computer network, and to a media interface 916, such as a diskette or CD-ROM drive, which can be provided to interface with media 918.

A data processing system suitable for storing and/or executing program code can include at least one processor 902 coupled directly or indirectly to memory elements 904 through a system bus 910. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 908 for making data entries; display 906 for viewing provenance graph and data; pointing device for selecting data; and the like) can be coupled to the system either directly (such as via bus 910) or through intervening I/O controllers (omitted for clarity).

Network adapters such as network interface 914 may also be coupled to the system to enable the data processing system to become coupled to other data processing systems or remote printers or storage devices through intervening private or public networks. Modems, cable modem and Ethernet cards are just a few of the currently available types of network adapters.

As used herein, a "server" includes a physical data processing system (for example, system 912 as shown in FIG. 9) running a server program. It will be understood that such a physical server may or may not include a display and keyboard.

That is, it is to be understood that the components shown in FIG. 1 may be implemented on one server or on more than one server.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. An article of manufacture for managing a history associated with a meeting, the article comprising a computer readable storage medium including program code which when executed by a computer performs the steps of:

collecting data associated with the meeting;
generating provenance data based on at least a portion of the collected data, wherein the provenance data is indicative of a lineage of one or more data items;
generating a provenance graph that defines a visual representation of the generated provenance data, wherein graph elements comprise one or more nodes and one or more edges between nodes, wherein nodes of the graph represent records associated with the collected data and edges of the graph represent relations between the records;
associating one or more applications with at least one graph element, wherein the one or more applications are selectable to invoke functionality; and
storing the generated provenance graph in a repository for use in analyzing the meeting;
wherein generating the provenance data based on the collected data comprises mapping the collected data onto a generic data model previously created to represent the meeting; and
wherein the generic data model comprises:
a plurality of provenance record types representing the nodes of the graph;
a base class from which each of the plurality of provenance record types respectively extend; and
a plurality of specializations which respectively extend from the plurality of provenance record types.

2. The article of claim 1, wherein the plurality of provenance record types comprise a data record type wherein a data record comprises a representation of an artifact produced or changed during the meeting.

3. The article of claim 1, wherein the plurality of provenance record types comprise a task record type wherein a task record comprises a representation of an execution of one particular meeting-related task.

4. The article of claim 1, wherein the plurality of provenance record types comprise a meeting record type wherein a meeting record comprises a representation of one instance of the meeting.

5. The article of claim 1, wherein the plurality of provenance record types comprise a resource record type wherein a resource record comprises a representation of a person or a resource that is relevant to a selected scope of provenance of the meeting.

6. The article of claim 1, wherein the plurality of provenance record types comprise a custom record type wherein a custom record comprises a representation of a domain-specific artifact.

7. The article of claim 1, wherein generating the provenance graph comprises adding the specializations to the provenance graph as the meeting progresses.

8. The article of claim 1, wherein generating the provenance graph comprises adding a key control point to the provenance graph as an indication of compliance with a predefined meeting rule.

9. The article of claim 1, wherein a plurality of the nodes share a common data structure and common attributes.

10. A system for managing a history associated with a meeting, comprising:

a memory and a processor operatively coupled to the memory;
a capture/recording module, executed on the processor, for collecting data associated with the meeting, and for generating provenance data based on at least a portion of the collected data, wherein the provenance data is indicative of a lineage of one or more data items;

an analytical enrichment module, executed on the processor, for generating a provenance graph that defines a visual representation of the generated provenance data, wherein graph elements comprise one or more nodes and one or more edges between nodes, wherein nodes of the graph represent records associated with the collected data and edges of the graph represent relations between the records;

an interface module, executed on the processor, for associating one or more applications with at least one graph element, wherein the one or more applications are selectable to invoke functionality; and a provenance store module, executed on the processor, for storing the generated provenance graph in a repository for use in analyzing the meeting;

wherein generating the provenance data based on the collected data comprises mapping the collected data onto a generic data model previously created to represent the meeting; and wherein the generic data model comprises:
- a plurality of provenance record types representing the nodes of the graph;
- a base class from which each of the plurality of provenance record types respectively extend; and
- a plurality of specializations which respectively extend from the plurality of provenance record types.

11. The system of claim 10, wherein the meeting comprises a virtual meeting.

12. The system of claim 10, wherein the plurality of provenance record types comprise a data record type wherein a data record comprises a representation of an artifact produced or changed during the meeting.

13. The system of claim 10, wherein the plurality of provenance record types comprise a task record type wherein a task record comprises a representation of an execution of one particular meeting-related task.

14. The system of claim 10, wherein the plurality of provenance record types comprise a meeting record type wherein a meeting record comprises a representation of one instance of the meeting.

15. The system of claim 10, wherein the plurality of provenance record types comprise a resource record type wherein a resource record comprises a representation of a person or a resource that is relevant to a selected scope of provenance of the meeting.

16. The system of claim 10, wherein the plurality of provenance record types comprise a custom record type wherein a custom record comprises a representation of a domain-specific artifact.

* * * * *